3,833,683
RUBBER-MODIFIED THERMOSETS AND PROCESS I

Ray A. Dickie, Birmingham, and Seymour Newman, Southfield, Mich., assignors to Ford Motor Company, Dearborn, Mich.
No Drawing. Original application Dec. 21, 1970, Ser. No. 100,465, now abandoned. Divided and this application May 29, 1973, Ser. No. 364,392
Int. Cl. C08g *45/04*
U.S. Cl. 260—836                    20 Claims

ABSTRACT OF THE DISCLOSURE

Improvements in impact strength and fatigue properties in thermoset materials are made by incorporating therein particulate graded-rubber having surface functionality for reaction with constituents of the thermosets. A variety of novel thermoset materials are produced under variations of this process. The graded-rubber particles are characterized by having a rubbery core and a glass-like polymeric outer shell.

---

This application is a divisional application of U.S. Patent Application Ser. No. 100,465, filed Dec. 21, 1970, now abandoned.

THE INVENTION

This invention is concerned with the modification of thermoset materials to provide improvements in their impact strength and fatigue properties. This invention has application to the broad spectrum of thermoset materials and involves the chemical incorporation of particulate materials having unique rubber-like properties with the constituents of a thermoset reaction system. Thermosets of this invention are compatible with conventional molding techniques, e.g., compression, injection, etc., and applicable to the production of structural material as, for instance, automobile body panels, electrical appliance housings, boat construction, storage tanks, conduits, particularly those for the transmission of heated fluids, etc. These thermosets also have application in the coatings field as, for instance, in radiation curable paints.

In most instances, the thermoset constituents, exclusive of the particulate material hereinafter described, will include a reactive prepolymer and where applicable a crosslinking agent. The particulate material is provided with surface functionality that will react with either the prepolymer or the crosslinking agent or both.

The prepolymer may be a conventional thermoset constituent of a well-known thermoset system, e.g., a phenol-formaldehyde resin, a melamine-formaldehyde resin, an alpha-beta olefinically unsaturated resin, resins of any of the epoxy-carboxy, epoxy-epoxy, epoxy-amine crosslinking systems, and others.

The unique particulate material which may be termed "graded rubber" has a rubber-like, elastomeric core of crosslinked acrylic polymer, a glass-like outer shell consisting essentially of a copolymer of about 30 to about 99 molar parts of methyl methacrylate and about 1 to about 70 molar parts of monomers copolymerizable with methyl methacrylate, at least one of which provides the particle with the desired surface functionality, and an intermediate layer consisting essentially of the copolymerization product of monomers used to form the core and the outer shell.

Particulate material of the same description excepting that the surfaces are non-functional, e.g., polymethylmethacrylate, may be used to modify these thermosets but the desirable properties obtainable with the preferred embodiments are materially diminished.

The concentration of graded-rubber particles homogeneously dispersed in the final product can be varied over a wide range in conformance with the properties desired for such product. Thus, it may be advisable in certain instances for this concentration to range upward from a minimum modifying amount to a major fraction by weight. In the main, however, the concentration and composition of the graded-rubber particles will be such that the elastomeric cores will comprise a minor proportion by weight of the final product, commonly between about 5 and about 40, more commonly between about 10 and about 30, weight percent of the final product. The weight relationship of the glass-like outer shell to the elastomeric core can be varied but for most purposes the weight of the outer shell will not substantially exceed that of the core. In most instances, the average weights of the outer shells will be about 10 to 60, preferably about 20 to about 50 percent of the average weight of the cores.

Preparation of the Graded-Rubber Particles

The process for preparing these particulate materials is at least a two-stage process. A major amount of monofunctional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., methyl methacrylate and one or more monomers copolymerizable therewith, is added slowly to the reaction mixture. The polymerization process is continued to yield a stable latex of relatively uniform particle size and composition as evidenced by electron microscopy. Additional surfactant may be added simultaneously with the second stage monomeric component.

The latex is coagulated, washed, and dried to yield a finely divided white powder which is suitable for blending with other constituents.

Generally, the particles are prepared from monomers that will provide a crosslinked, acrylic, rubber-like core and a glass-like polymeric outer shell at room temperature, e.g., 20–30° C. The terms rubber-like and glass-like are, of course, meaningless except when used in reference to a specific temperature or temperature range. The particles should be formulated so that when molded the core retains such rubber-like properties and the outer shell retains its glass-like properties at all temperatures encountered by articles of commerce in the intended field of use. Hence, for practical purposes, the monomer should be selected so that the core has a glass transition temperature that is substantially below that of the outer shell. Advantageously, the difference in glass transition temperatures between the core and shell is at last 50° C., preferably above 100° C.

The core is formed from a major amount of an alkyl acrylate and a crosslinking amount of a di- or tri-functional monomer containing two or more non-conjugated terminal ethylenic groups. The monofunctional alkyl monoacrylate is preferably an ester of a $C_2$-$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special applications, the monoacrylate component of the core will be either an ester (or esters) of acrylic acid or a mixture of a major amount of the same and a minor amount of methacrylates.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylol ethane triacrylate, 1,1,1-trimethylol ethane trimethacrylate, 1,1,1-trimethylol propane triacrylate, 1,1,1-trimethylol propane trimethacrylate 1,4 - cyclohexane dimethanol dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol.

In the first stage reaction, there is preferably employed about 80 to about 98 mole percent of the monofunctional monoacrylate and about 20 to about 2 mole percent of the crosslinking agent. In the second stage reaction, the mixture of methyl methacrylate and monomers copolymerizable therewith are added before the first reaction ceases. The amounts of the second stage reactant or reactants relative to the combined first stage reactants may vary widely depending upon the physical properties desired in the moldings produced from these particles, i.e., from about 10 to about 90 to about 90 to about 10 weight percent.

The particulate materials can be prepared with a variety of different functional groups on the surfaces for reaction with thermoset constituents. This functionality includes, but is not limited to epoxy, carboxy, and hydroxy functionality. The outer shell is formed from methyl methacrylate and a "balance" of monomers copolymerizable therewith, at least one of which is difunctional. The minimum concentration of methyl methacrylate in the monomer mix will be about 30 mole percent. In one such embodiment, the monomer mix used will contain about 30 to about 99 mole percent methyl methacrylate, 0 to 35 mole percent of a compound or compounds selected from monovinyl hydrocarbons and other monofunctional acrylates, and about 1 to about 45, advantageously about 5 to about 40, and preferably about 10 to about 35 mole percent of one or more difunctional monoacrylates such as glycidyl methacrylate, hydroxyethyl methacrylate, hydroxy-ethyl acrylate, hydroxypropyl acrylate, hydroxypropyl methacrylate, mixtures thereof, and/or other epoxide or hydroxyl bearing monoacrylates. Carboxy functionality can be afforded by adding a small amount, e.g., 1 to 10 mole percent of acrylic or methacrylic acid to the monomer mix used to form the outer shell. This is preferably added in a last fraction of monomers to be introduced. If vinyl hydrocarbons or acrylates other than methyl methacrylate are employed with the difunctional compounds, the vinyl hydrocarbons and/or acrylates so employed are preferably the monofunctional monoacrylates and/or monofunctional vinyl hydrocarbons. Suitable monofunctional monoacrylates for this purpose include esters of acrylic or methacrylic acid with a monohydric alcohol, preferably a $C_1$ to $C_8$ monohydric alcohol, e.g., ethyl acrylate, butyl acrylate, butyl methacrylate, and 2-ethyl hexyl acrylate. A minor amount of higher alkyl acrylate, e.g., dodecyl methacrylate, may also be used. Suitable monovinyl hydrocarbons for this purpose include styrene, alpha-methyl styrene, and vinyl toluene. Depending upon the end product desired, it will sometimes be advantageous to have a limited amount of crosslinking in the outer shell and hence to include with the methyl methacrylate and the difunctional monoacrylate a minor amount of a diacrylate or divinyl hydrocarbon, e.g., divinyl benzene or 1,3-butylene diacrylate.

The physical properties of the outer shell may be otherwise modified by replacing up to about 30 mole percent of the monofunctional monoacrylate with acrylonitrile or methacrylonitrile. Likewise, one may replace up to about 30 mole percent of the monofunctional monoacrylates heretofore mentioned with an equimolar amount of isobornyl methacrylate. In each of these embodiments, as in all others, the monomer mix used to form the outer shell will contain at least about 30 mole percent methyl methacrylate.

It is also within the scope of this invention to carry out further reactions after particle formation, as for instance, to react a di- or tri- functional monomer with a functionality of said surface in order to alter the character or functionality of said surface, e.g., acrylic or methacrylic acid with epoxy-functional particles. In other embodiments, a carboxy or hydroxy functional particle may be reacted with an acyl halide e.g., methacrylyl chloride, and the resultant product further reacted in the thermoset system.

The initial monomer charge is usually emulsified by one or more micelle-forming compounds composed of a hydrophobic part, such as a hydrocarbon group containing eight or more carbon atoms, and a hydrophilic part, such as alkali metal or ammonium carboxylate groups, phosphate or sulfate partial ester groups, sulfonate groups, and the like. Exemplary emulsifying agents include alkali metal sulfonates of styrene, naphthalene, decyl benzene, and dodecyl benzene; sodium dodecyl sulfate; sodium stearate; sodium oleate; the sodium alkyl aryl polyoxymethylene sulfates and phosphates; the ethylene oxide condensates of long chain fatty acids, alcohols, and mercaptans, and the alkali metal salts of rosin acids. These materials and the techniques of their employment in emulsion formation and maintenance are well known to the art. As they are conventional materials employed in a conventional manner, further description and explanation are unnecessary.

The polymerization initiator is composed of one or more water-soluble, free-radical-generating species such as hydrogen peroxide or the sodium, potassium, or ammonium persulfates, perborates, peracetates, percarbonates, and the like. As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the polymer; such chain transfer agents are generally mercaptans such as dodecanethiol; benzenethiol, pentanethiol, and butanethiol.

Those skilled in the art will be aware that other emulsifying agents, polymerization initiators and chain transfer agents may be used when compatible with the polymerization system herein employed.

The reaction may be carried out at temperatures from about 40° C. to 80° C., or at lower temperatures, as from 0° C. to 80° C. in the case of activated systems.

Determination of the concentration of reactive epoxy groups on the shell of the graded-rubber particles can be made by the method involving addition of tetraethylammonium bromide followed by titration with perchloric acid in acetic acid using crystal violet as indicator. This method is described by R. R. Jay in Analytical Chemistry, Vol. 36, page 667 (1964). Determination of the concentration of reactive hydroxyl groups on the shell of the graded-rubber particles can be made by the well-known method of analysis wherein the hydroxy groups are reacted with acetic anhydride using a pyridine catalyst. The acetic acid produced is then back titrated with sodium hydroxide. For details, see Steyermark, Quantitive Organic Analysis, pages 302–303, published by Blakiston Company, New York, Toronto, and Philadelphia (1951). For determination of hydroxyl groups, carboxyl groups and molecular weight also see the methods described by W. R. Sorenson and T. W. Campbell in "Preparative Methods of Polymer Chemistry," Interscience Publishers, New York, N.Y., U.S.A. (1961) at page 134.

This invention will be more fully understood from the following examples which illustrate the modification of typical thermoset materials with the hereinbefore described graded-rubber particles.

Example 1

A polyester prepolymer, known hereinafter as Resin A, is prepared according to procedures well known in the art from an equimolar mixture of orthophthalic acid and maleic anhydride and neopentyl glycol in an amount 5% in excess of the stoichiometric requirement.

To 1000 parts by weight water which has been boiled and cooled to room temperature under a nitrogen atmosphere are added 2.86 parts by weight sodium dodecyl sulfate dissolved in 35.7 parts by weight water and about ⅙ of a monomer mixture consisting of 348 parts by weight butyl acrylate and 32.3 parts by weight 1,3-butylene dimethylacrylate. The mixture is stirred to establish dispersion of the monomers. To the stirred mixture are added 3.14 parts by weight potassium persulfate dissolved in 71.4 parts by weight water. The mixture is heated to 45° C. After about 10 minutes, addition of the remainder of the first monomer mixture is begun at a rate such that the temperature of the reaction mixture is maintained at 47° to 49° C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of (1) a mixture of 236 parts by weight methyl methacrylate, 143.4 parts by weight glycidyl methacrylate, and 2.57 parts by weight 1-dodecanethiol, and (2) a solution of 5.72 parts by weight sodium dodecyl sulfate in 35.7 parts by weight water. This addition, which requires about 40 minutes, is carried out at such a rate that the temperature of the reaction mixture is maintained at 47° to 49° C. Following this addition, the mixture is maintained at 47° to 49° C. for an additional two hours. The resulting latex, known hereinafter as Latex A, is cooled to room temperature and neutralized with aqueous ammonia. The overall conversion of monomers is about 98%. The average size of these particles is in the range of 0.1 to 0.2 micron.

Latex A is coagulated by adding one volume of latex to approximately 4 volumes of methyl alcohol to which has been added 0.001 volume concentrated hydrochloric acid. The coagulum is isolated by filtration, washed with several volumes of methyl alcohol, and with water, and is dried in vacuo to yield Powder A.

Twenty parts by weight of Powder A are dispersed in 200 parts by weight unpurified commercial styrene monomer. To this dispersion is added methacrylic acid in an amount providing about one carboxyl group per each epoxy group in the outer shells of the rubber particles and a catalytic amount (0.1 parts by weight based on methacrylic acid) benzyl triethyl ammonium chloride. The dispersion is heated until the reaction between the methacrylic acid and the epoxy groups on the graded-elastomeric particles is at least 50% complete.

The resulting dispersion is blended with an appropriate amount (as hereinafter defined) of Resin A and benzoyl peroxide. Sufficient styrene monomer is removed by vacuum distillation to yield a final molding composition comprising 20% by weight rubber (based on the core portion of the graded-rubber particles) for a total of 40% by weight graded-rubber particles and 60% by weight polyester-styrene present in weight ratio 65:35; the benzoyl peroxide concentration is 2% by weight based on polyester-styrene content. The blend is molded for 15 minutes at 115° C. and postcured at 120° C. for three hours to yield a hard, acetone-insoluble article. Room temperature tensile properties are given below:

Elongation-to-break, percent _____ 7.5
Stress at break, p.s.i. _____ 5,700
Modulus, p.s.i. _____ 292,000

Example 2

For purposes of comparison, Resin A is blended with styrene monomer in weight ratio 65:35 and 2% by weight benzoyl peroxide is added. The blend is molded at 115° C. for 15 minutes and postcured at 120° C. for three hours to yield a hard, acetone insoluble article. Room temperature tensile properties are given below:

Elongation-to-break, percent _____ 3.1
Stress at break, p.s.i. _____ 8,100
Modulus, p.s.i. _____ 418,000

Example 3

The procedures of Example 1 are repeated with the difference that acrylic acid replaces methacrylic acid in the modification of the graded-rubber particles.

Example 4

To 1000 parts by weight water which has been boiled and cooled to room temperature under a nitrogen atmosphere are added 2.86 parts by weight sodium dodecyl sulfate dissolved in 35.7 parts by weight water and about ⅑ of a monomer mixture consisting of 521 parts butyl acrylate and 48.5 parts by weight of 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is begun at a rate such that the temperature of the reaction mixture is maintained at 47° to 50° C. During the addition of the last two-thirds of the first monomer mixture, 5.72 parts by weight sodium dodecyl sulfate dissolved in 35.7 parts by weight water are added at a substantially constant rate. The reaction mixture is maintained at 47° to 50° for about 40 minutes prior to beginning simultaneous dropwise addition of (1) 190 parts by weight of a monomer mixture consisting of methyl methacrylate, styrene, and glycidyl methacrylate present in mole rate 35:35:30, and (2) 2.86 parts by weight sodium dodecyl sulphate dissolved in 35.7 parts by weight water. This addition is carried out at such a rate that the mixture is maintained at 47° to 50° C. Following this addition, the temperature is held at 47° to 50° C. for an additional two hours. The resulting latex known as Latex B, is cooled to room temperature.

A portion of Latex B is coagulated by adding one volume of latex rapidly but dropwise to approximately four volumes of rapidly stirred methyl alcohol which has been heated to about 60° C. before beginning the coagulation. The resulting coagulum is filtered, washed, and dried in vacuo to yield a white powder hereinafter known as Powder B.

Twenty parts by weight of Powder B are dispersed in 200 parts by weight unpurified commercial styrene monomer. To this dispersion is added methacrylic acid in an amount providing about one carboxyl group per each epoxy group in the outer shells of the rubber particles and a catalytic amount (0.1 parts by weight based on methacrylic acid) benzyl triethyl ammonium chloride. The dispersion is heated until the reaction between the methacrylic acid and the epoxy groups on the graded-elastomeric particles is at least 50% complete.

The resulting dispersion is blended with an appropriate amount of Resin A (alpha-beta olefinically unsaturated polyester) and benzoyl; styrene monomer is removed by vacuum distillation to yield a molding material comprising 20% by weight rubber (based on the core portion of the graded-rubber particles) for a total of 26.7% by weight graded-rubber particles and 73.3% by weight polyester-styrene present in weight ratio 65:35; the benzoyl peroxide concentration is 2% by weight based on polyester-styrene content.

The blend is molded for 15 minutes at 115° C. and post-cured at 120° C. for three hours to yield a hard, acetone-insoluble article. Room temperature tensile properties are given below:

Elongation-to-break, percent _____ 6.2
Stress at break, p.s.i. _____ 7,200
Modulus, p.s.i. _____ 300,000

Example 5

The procedures of Example 4 are repeated with the difference that acrylic acid replaces methacrylic acid in the modification of the graded-rubber particles.

Example 6

The composite molding material of Example 4 is used in preparation of a glass fibre reinforced composite containing 20% by volume ⅛" polyester compatible chopped glass fibres. Room temperature tensile properties of this material as well as of a composite based on the polyester-styrene molding compound of Example 2 containing 20% by volume ⅛" chopped glass fibres are given below:

|  | Elongation to break, percent | Stress at break, p.s.i. | Modulus, p.s.i. |
| --- | --- | --- | --- |
| Polyester/styrene/glass mold | 0.7 | 8,300 | 1,400,000 |
| Polyester/styrene/rubber glass mold | 1.2 | 12,000 | 1,100,000 |

In addition to displaying markedly superior strength, the rubber-reinforced glass-containing composite displays much better retention of modulus on repeated stressing.

Example 7

The procedures of the preceding examples are repeated with the difference that the polyester resin is formed from an equimolar mixture of orthophthalic acid and maleic anhydride with propylene glycol in an amount 5% in excess of the stoichiometric requirement.

Example 8

The procedures of the preceding examples are repeated with the difference that vinyl toluene is substituted for styrene.

Example 9

A thermoset prepolymer emulsion is prepared in the following way: To 800 parts by weight water which has been boiled and cooled to room temperature under a nitrogen atmosphere are added 4 parts by weight sodium dodecyl sulfate in 25 parts by weight water and about one-third of a mixture consisting of 186.6 parts by weight methyl methacrylate, 113.4 parts by weight glycidyl methacrylate, and 2.0 parts by weight 1-dodecanethiol. The mixture is stirred to establish dispersion of the monomers. To the stirred mixture is added 3.2 parts by weight potassium persulfate dissolved in 75 parts by weight water. The mixture is heated to about 55° C. After the initial exotherm has subsided, the remainder of the monomer mixture is added at a rate such that the temperature of the reaction mixture is maintained at about 55° C. Following this addition, the reaction mixture is maintained at about 55° C. for an additional two hours. The resulting latex is cooled to room temperature and blended with a sufficient amount of Latex A (Example 1 epoxy-functional rubber particles) to yield a molding compound containing about 25% rubber (based on the core portion of the graded-rubber particles). The mixed emulsion is coagulated by adding one volume of latex to approximately 8-10 volumes of methyl alcohol acidified with 0.001 volume concentrated hydrochloric acid. The coagulum is further washed with methyl alcohol, a catalytic amount (about 1% by weight based on the epoxy-bearing portion of the blend) of 2-ethyl-4-methyl-imidazole is added, and a molding powder is isolated by drying in vacuo. The molding powder is compression molded at 400° F. for 15 minutes to yield a hard article which is by comparison much tougher than a similar article prepared without incorporation of graded-rubber particles. Room temperature tensile properties of both materials are given below:

|  | Elongation to break, percent | Stress at break, p.s.i. | Modulus, p.s.i. |
| --- | --- | --- | --- |
| Molded article without rubber | 2.2 | 8,200 | 460,000 |
| Molded article with rubber | 27.0 | 6,100 | 260,000 |

Example 10

The procedures of Example 9 are repeated with the difference that Latex B (Example 4 epoxy-functional rubber particles) is substituted for Latex A (Example 1) in the preparation of the blend.

Example 11

The composite molding material of Example 9 is used in preparation of a glass fibre reinforced composite containing 20% by volume ¼" epoxy-compatible chopped glass fibre. Room temperature tensile properties of this material as well as of a similar composite omitting the rubber particles are given below:

|  | Elongation to break, percent | Stress at break, p.s.i. | Modulus, p.s.i |
| --- | --- | --- | --- |
| Molded article without rubber but with glass fibre | 0.7 | 5,900 | 1,960,000 |
| Molded article with rubber and glass fibre | 1.0 | 7,400 | 1,160,000 |

The rubber modified material shows markedly improved strength. Furthermore, the rubber modified material displays much better retention of modulus on repeating stressing.

Example 12

A thermoset prepolymer is prepared by adding a mixture of 30.0 parts by weight methacrylic acid, 23.4 parts by weight methacrylonitrile, 46.6 parts by weight methyl methacrylate, and 3.7 parts by weight di-t-butyl perbenzoate slowly, dropwise over a three to four hour period to sufficient refluxing dioxane to result in a final concentration of polymer of about 30% by weight. The solution is coagulated by dropwise addition to 5 to 7 volumes of rapidly stirred hexane. The prepolymer is filtered and dried in vacuo. A 20% by weight total solids solution is then prepared in dioxane comprising the prepolymer, a stoichiometric amount of the diglycidyl ether of Bisphenol A, and a catalytic amount (about 1.0% by weight based on prepolymer) of N, N-dimethyl benzyl amine. This solution is used in preparation of rubber reinforced molding compounds in the following way. A latex is prepared according to the procedures given for Latex A (Example 1) with the differences that (1) the first monomer mixture comprises 90 mole percent butyl acrylate and 10 mole percent 1,3-butylene dimethacrylate and (2) the second monomer mixture comprises 45 mole percent methyl methacrylate, 45 mole percent glycidyl methacrylate, and 10 mole percent 1,3-butylene dimethacrylate. This latex is coagulated by addition of one volume of latex to four volumes of methanol acidified with 0.001 volume concentrated hydrochloric acid. The coagulum is isolated by gentle centrifugation and is subsequently dispersed (without drying) in dioxane to yield a dispersion containing about 15% solids. This dispersion is blended with the thermoset prepolymer-crosslinker-catalyst solution; the mixture is freeze-dried and the resulting molding powder is compression molded to yield a hard article insoluble in acetone. Elongation-to-break is found to be monotonically increasing function of rubber content, at least up to 25% by weight rubber (based on the core portion of the graded-rubber particles). Specimens containing 25% weight rubber (based on the core portion of the graded-rubber particles) are found to have an elongation-to-break at least double that of specimens omitting the rubber.

Example 13

The procedures of Example 12 are repeated with the difference that the shell of graded-rubber particles is formed from a monomer mixture comprising essentially 95 mole percent methyl methacrylate and 5 mole percent methacrylic acid.

Example 14

An acrylic thermoset prepolymer of a different type is prepared by slowly adding a mixture of 60.0 parts by weight glycidyl methacrylate, 140.0 parts by weight methyl methacrylate, and 4.0 parts by weight 2,2' azobis [2-methylpropionitrile], to 200 parts by weight rapidly stirred toluene maintained at reflux temperature under a nitrogen atmosphere. Upon completion of the addition, 0.2 parts by weight 2,2'-azobis [2-methylpropionitrile] dissolved in 25 parts by weight toluene is added over a thirty minute period. The reaction mixture is maintained at 110° C. for an additional two hours. The reaction mixture is then cooled to below 50° C. and there is added 34 parts by weight methacrylic acid, 1.5 parts by weight benzyl triethyl ammonium chloride, and 0.2 parts by weight hydroquinone. The mixture is stirred at 85° C. for several hours until titration shows more than 95% of the methacrylic acid reacted and infrared analysis shows more than 95% of the glycidyl group consumed. The reaction mixture is cooled, diluted with toluene to 30% solids, and coagulated in 5 to 7 volumes of hexane. The resultant white powder hereinafter referred to as Powder C is dried in vacuo for four hours at 60° C.

About 70 parts by weight Powder A (Example 1 epoxy-functional rubber particles) are dissolved in 150 parts by weight acetone. To this solution is added methacrylic acid in an amount providing about one carboxyl group per each epoxy group in the outer shells of the rubber particles. To the mixture is added a catalytic amount (1.5 parts by weight) benzyl triethyl ammonium chloride. The dispersion is heated until reaction between the methacrylic acid and the epoxy groups on the graded-rubber particles is substantially complete. The rubber particles are separated from the acetone, dried, and dispersed in 150 parts by weight methyl methacrylate. To this dispersion are added 200 parts by weight Powder C (unsaturated acrylic prepolymer and a catalytic amount (0.1 parts by weight) di-t-butyl peroxide. The dispersion is compression molded at 100° C. for 15 minutes to yield a hard article insoluble in acetone. By comparison, this mold is much tougher than an identically prepared mold which omits the graded-elastomeric particles.

Example 15

The procedures of Example 14 are repeated with the difference that Powder C (unsaturated acrylic prepolymer) is replaced by a prepolymer prepared in the following way: A mixture of 70 parts by weight glycidyl methacrylate, 90 parts by weight methyl methacrylate, 40 parts by weight methacrylonitrile, and 4 parts by weight 2,2'-azobis-[2-methylproprionitrile] is added slowly to a refluxing mixture of 150 parts by weight toluene and 150 parts by weight dioxane under a nitrogen atmosphere. The prepolymer obtained is reacted with 45 parts by weight methacrylic acid using 1.5 parts by weight benzyl triethyl ammonium chloride as catalyst in the presence of 0.2 parts by weight hydroquinone. Upon completion of this reaction, the mixture is diluted with acetone to 30% by weight solids and is coagulated in 5 to 7 volumes of hexane. The resultant white powder hereinafter referred to as Powder D is dried in vacuo at 60° C. for four hours.

Upon substitution of Powder D for Powder C in Example 14, a hard molded article is obtained which is insoluble in acetone or toluene. By comparison, the molded piece is much tougher than an identically prepared molded piece which omits the graded-rubber particles.

Example 16

The procedures of Examples 14 and 15 are repeated with the difference that an equimolar amount of acrylic acid is substituted for methacrylic acid in the reaction with the epoxy groups on the surfaces of the graded-rubber particles.

Example 17

Another thermoset is prepared with incorporation of the graded-rubber particles in the following manner: Sixty parts by weight glycidyl methacrylate, 140 parts by weight methyl methacrylate, 4 parts by weight 2,2'-azobis-[2-methylpropionitrile], and 6 parts by weight 1-dodecanethiol are mixed and added to 600 parts by weight water (freshly boiled to remove dissolved oxygen and cooled to room temperature under a nitrogen atmosphere) which contains 1.8 parts by weight polyvinyl alcohol and 18 parts by weight sodium chloride.

The mixture is stirred vigorously and gently heated to 50° C. When an exothermic reaction is observed, external heating is discontinued. The reaction mixture is maintained at 60° C. for three hours. The polymer thus obtained is filtered, washed with methyl alcohol, and dried in vacuo at 60° C. for six hours.

One hundred-ninety parts by weight of the powder obtained is mixed with 150 parts by weight methyl methacrylate, 140 parts by weight Powder A (Example 1 functional rubber particles), sufficient methacrylic acid to provide about one acid functionality per each epoxy group in the mixture, one part by weight benzyl triethyl ammonium chloride, and 0.2 parts by weight hydroquinone. Dispersion of the rubber particles is achieved by blending with a Brabender mixer equipped with sigma blades. The mixture is heated to 80° C. until the reaction between acid groups and glycidyl groups is substantially complete. One weight percent di-t-butyl perbenzoate is added and the mixture is compression molded for 15 minutes at 100° C. to yield a hard molded article which is insoluble in acetone.

Example 18

The procedures of Example 17 are repeated with the difference that the thermoset prepolymer is formed from a monomer mixture comprising 30 mole percent glycidyl methacrylate, 30 mole percent methacrylonitrile, and 40 mole percent methyl methacrylate.

Example 19

The procedures of Examples 14–18 are repeated with the difference that the dispersion of prepolymer, methyl methacrylate, and graded-rubber particles is diluted with methyl methacrylate until the total concentration of unreacted methyl methacrylate is 40 weight percent. This material is sprayed on wood, metal, and polymeric substrates and cross-linked thereon by exposing the resultant coating to an electron beam having average energy of about 295,000 electron volts in a nitrogen atmosphere.

Example 20

Graded-rubber particles are prepared according to the procedure given in Example 4 for Powder B (epoxy-functional rubber particles) with the difference that the outer shell of all the particles is formed from a monomer mixer comprising methyl methacrylate, butyl acrylate, and glycidyl methacrylate present in mole ratio 35:35:30; this material is crushed to a very fine powder at about —80° C. and is hereinafter referred to as Powder E. The latex precursor of Powder E is designated Latex E.

One hundred parts by weight of a commercial grade DGEBA (diglycidyl ether of Bisphenol A) of equivalent weight about 190 is mixed with ten parts by weight phenyl glycidyl ether, twelve parts by weight triethylene tetramine, and fifty parts by weight Powder E. The mixture is thoroughly blended using a Brabender mixer equipped with sigma blades. The mixture is molded and allowed to cure at room temperature for seven days followed by a two hour postcure at 60° C. to yield a hard, translucent, rubber-modified epoxy resin.

Example 21

Two hundred parts by weight Latex E (epoxy-functional rubber particles) are blended with 100 parts by weight wood flour. The mass is dried in vacuo at 40° C. for 24 hours, blended with 100 parts by weight of a commercial grade DGEBA of equivalent weight 190 and three parts by weight boron trifluoride monoethylamine. The mixture is molded at 120° C. for one hour followed by a postcure at 150° C. for two hours.

Example 22

Twenty parts by weight Powder E (Example 20 epoxy-functional rubber particles) are dispersed in 200 parts by weight benzene. To this dispersion is added acrylic acid in an amount providing about one carboxyl group per each epoxy group in the outer shells of the rubber particles, 0.2 parts by weight hydroquinone and a catalytic amount (0.1 parts by weight based on acrylic acid) of benzyl triethyl ammonium chloride. The dispersion is heated until reaction between the acrylic acid and the glycidyl groups on the rubber particles is substantially complete.

To the resulting dispersion is added a benzene solution of sixty parts by weight of an allyl prepolymer (formed by partial polymerization of diallyl phthalate according to procedures well known in the art). The mixture is freeze-dried and crushed to a powder. Two percent by weight d-t-butyl perbenzoate is added and the molding powder is compression molded at 175° C. for 15 minutes to yield a hard, translucent, rubber-modified allyl resin.

Example 23

A mixture of 100 parts by weight melamine and 290 parts by weight 37% neutralized aqueous formaldehyde is stirred and heated at reflux for 40 minutes. The reaction mixture is cooled to room temperature and thoroughly mixed with 100 parts by weight wood flour, one part by weight zinc stearate, and 200 parts by weight Latex E (epoxy-functional rubber particles). The mass is dried for four hours at 70°–80° C., ground to a uniform powder and compression molded at 150° C. for 15 minutes to yield a hard article insoluble in acetone.

Example 24

Fifty parts by weight finely ground novolac (phenol-formaldehyde resin), 50 parts by weight dry wood flour, 7 parts by weight hexamethylene-tetramine, 2 parts by weight magnesium oxide, 1 part by weight calcium stearate, and 20 parts by weight Powder E (unsaturated epoxy-functional rubber particles) are blended in a ball mill. The blend is compression molded at 160° C. for 5 minutes to give a hard, insoluble article.

Example 25

Graded-rubber particles are prepared in accordance with the procedure of Latex B of Example 4 with the difference that the particles are provided with hydroxy functionality by substituting an equimolar amount of hydroxyethyl methacrylate for the glycidyl methacrylate. The hydroxy-functional graded-rubber particles are incorporated into a thermoset molding system employing the following procedure: The graded-rubber particles are isolated as a powder and blended in a ball mill with a sufficient amount of solid epoxy resin (e.g., a condensate of epichlorohydrin and Bisphenol A of molecular weight about 1,000) to obtain a final rubber concentration (based on the core portion of the rubber particles) of 20% by weight. One hundred parts by weight of the resulting powder is heated to 120° C., and 20 parts by weight molten phthalic anhydride is added. The mixture is molded at 120° C. for one hour, followed by two hours at 170° C. to yield a hard insoluble article.

Example 26

The procedure of Example 25 is repeated except for the difference that an equimolar amount of hydroxyethyl acrylate is substituted for the hydroxyethyl methacrylate.

Example 27

The procedure of Example 25 is repeated except for the difference that an equimolar amount of hydroxypropyl methacrylate is substituted for the hydroxyethyl methacrylate.

Example 28

The procedure of Example 25 is repeated except for the difference that an equimolar amount of hydroxypropyl acrylate is substituted for the hydroxyethyl methacrylate.

Example 29

The procedure of Example 1 is repeated except for the difference that in the preparation of the polyester prepolymer there is substituted an equimolar amount of tetrahydrophthalic anhydride for the orthophthalic acid and an equimolar amount of fumaric acid for the maleic anhydride.

Example 30

The procedure of Example 1 is repeated except for the difference that in the preparation of the polyester prepolymer, an equimolar amount of cyclohexane dicarboxylic acid is substituted for the orthophthalic acid and an equimolar amount of propylene glycol is substituted for the neopentyl glycol.

Example 31

The procedure of Example 1 is repeated except for the difference that in the preparation of the polyester prepolymer there is substituted an equimolar amount of ethylene glycol for the neopentyl glycol and an equimolar amount of itaconic anhydride is substituted for the maleic anhydride.

Example 32

The procedure of Example 1 is repeated except for the difference that in the preparation of the polyester prepolymer there is substituted an equimolar amount of 2-butene-1,4 diol for the neopentyl glycol.

Example 33

The procedure of Example 1 is repeated except for the difference in the preparation of the polyester prepolymer where there is substituted an equimolar amount of 1,6-hexamethylene glycol for the neopentyl glycol.

EXAMPLE 34

The procedure of Example 1 is repeated except for the difference in the preparation of the polyester prepolymer. An equimolar amount of 1,2-propanediol is substituted for the neopentyl glycol.

Example 35

The procedure of Example 1 is repeated except for the difference in the preparation of the graded-rubber particles wherein the monomer mixture employed to form the outer shell is a mixture of about 30 mole percent methyl methacrylate, 10 mole percent ethyl acrylate, 10 mole percent vinyl acetate, 10 mole percent butyl methacrylate, 10 mole percent methacrylonitrile, 10 mole percent vinyl toluene and 10 mole percent glycidyl methacrylate. The monomer mixture excepting the glycidyl methacrylate is divided into 3 equal portions. The first two portions are added dropwise to the reaction mixture. The glycidyl methacrylate is mixed with the third portion and this mixture is then added dropwise to the reaction mixture.

Example 36

The procedure of Example 1 is repeated except for the difference in the preparation of the graded-rubber particles wherein the core is prepared from about 90 mole percent 2-ethyl hexyl acrylate and 10 mole percent 1,3-butylene diacrylate and the monomer mixture employed to form the outer shell is a mixture of 40 mole percent methyl methacrylate, 10 mole percent acrylonitrile, 10 mole percent butyl acrylate, 10 mole percent alpha methyl styrene and 30 mole percent of glycidyl methacrylate.

Example 37

The procedure of Example 36 is repeated except for the difference that glycidyl acrylate is substituted for the glycidyl methacrylate.

Example 38

The procedure of Example 1 is repeated except for the difference in the preparation of the graded-rubber particles wherein the core is prepared from about 90 mole percent butyl acrylate and about 10 mole percent of divinyl benzene and the monomer mixture employed to form the outer shell is a mixture of 60 mole percent methyl methacrylate, 30 mole percent glycidyl methacrylate and 10 mole percent divinyl benzene.

The terms "acrylate" and "acrylates," when used herein without a modifier distinguishing between esters of acrylic and methacrylic acid, shall be understood to include both. This, of course, does not apply to the naming of a specific compound.

The foregoing examples are illustrative of the invention defined in the amended claims. Those skilled in the art will be aware that modifications may be made therein without departing from the scope of the invention as set forth in the appended claims.

We claim:

1. In a method for forming a molded, thermoset, polymeric material wherein a polymer of polymerized unsaturated compounds and a crosslinking agent reactive therewith are intimately mixed, molded and reacted with each other, the improvement wherein:
   A. said crosslinking agent is a graded-rubber particle consisting essentially of
      (1) about 10 to about 90 weight percent of a core of crosslinked acrylic polymer consisting essentially of
         (a) a major amount of a monofunctional monoacrylate, constituting at a minimum about 80 mole percent and
         (b) a minor and crosslinking amount of a di-or tri-functional monomer containing two or more non-conjugated terminal ethylenic groups, not exceeding about 20 mole percent of the core reactants and
      (a) about 90 to about 10 weight percent an outer shell formed by polymerization of a mixture of monomers consisting essentially of about 30 to about 98 mole percent methyl methacrylate, 0 to about 68 mole percent of unsaturated monomers selected from monofunctional mono-acrylates, diacrylates, monovinyl hydrocarbons, and divinyl hydrocarbons, and about 2 to about 35 mole percent of a monomer having an olefinic group reactable with said methyl methacrylate and an epoxy-functional group which
         (a) remains unreacted in said polymerization and
         (b) provides said shell with surface functionality that is reactive with said polymer, of polymerized unsaturated compounds and
   B. said polymer of polymerized unsaturated compounds has functionality selected from carboxy functionality, epoxy functionality and hydroxy functionality and being present in a crosslinking amount.

2. A method in accordance with Claim 1 wherein said core is formed from about 80 to about 98 mole percent of an ester of acrylic acid and a $C_2$–$C_8$ monohydric alcohol and about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ trihydric alcohol.

3. A method in accordance with Claim 1 wherein said functionality of said polymer of polymerized unsaturated compounds is carboxy functionality.

4. A method in accordance with Claim 1 wherein said functionality of said polymer of polymerized unsaturated compounds is epoxy functionality.

5. A method in accordance with Claim 1 wherein said functionality of said polymer of polymerized unsaturated compounds is hydroxy functionality.

6. In a method for forming a molded, thermoset, polymeric material wherein a polymer of polymerized unsaturated compounds having functionality selected from carboxy functionality, epoxy functionality and hydroxy functionality and a polyepoxide having at least two epoxy groups per molecule reactive therewith in crosslinking amounts are intimately mixed, molded and reacted with each other, the improvement wherein said polymer and said polyepoxide are intimately mixed prior to molding with graded rubber particles having surface epoxy functionality that is reactive with said polymer, said polyepoxide or both said polymer and said polyepoxide, and molding and reacting said polymer said crosslinking agent and said graded rubber particles, said graded-rubber particles consisting essentially of
   (1) about 10 to about 90 weight percent a core of crosslinked acrylic polymer consisting essentially of
      (a) a major amount of a monofunctional monoacrylate constituting at a minimum 80 mole percent, and
      (b) a minor and crosslinking amount of a di- or tri- functional monomer containing two or more non-conjugated terminal ethylenic groups, not exceeding about 20 mole percent of the core reactants, and
   (2) about 90 to about 10 weight percent an outer shell formed by polymerization of a mixture of monomers consisting essentially of about 30 to about 98 mole percent methyl methacrylate, 0 to about 68 mole percent of unsaturated monomers selected from monofunctional monoacrylates, diacrylates, monovinyl hydrocarbons, and divinyl hydrocarbons, and about 2 to about 35 mole percent of a monomer having an olefinic group reactable with said methyl methacrylate and an epoxy-functional group which
      (a) remains unreacted in said polymerization and
      (b) provides said shell with surface functionality that is reactive with said polymer, of polymerized unsaturated compounds.

7. A method in accordance with Claim 6 wherein said core is formed from about 80 to about 98 mole percent of an ester of acrylic acid and a $C_2$–$C_8$ monohydric alcohol and about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ trihydric alcohol.

8. A method in accordance with Claim 6 wherein said functionality of said polymer of polymerized unsaturated compounds is carboxy functionality.

9. A method in accordance with Claim 6 wherein said functionality of said polymer of polymerized unsaturated compounds is epoxy functionality.

10. A method in accordance with Claim 6 wherein said functionality of said polymer of polymerized unsaturated compounds is hydroxy functionality.

11. In a molded, thermoset, polymeric material comprising a polymer and a crosslinking agent reacted therewith, the improvement wherein
A. said crosslinking agent is a graded-rubber particle consisting essentially of
   (1) about 10 to about 90 weight percent of a core of crosslinked acrylic polymer consisting essentially of
      (a) a major amount of a monofunctional monacrylate constituting at a minimum about 80 mole percent, and
      (b) a minor and crosslinking amount of a di- or tri- functional monomer containing two or more non-conjugated terminal ethylenic groups not exceeding about 20 mole percent of the core reactants, and
   (2) about 90 to about 10 weight percent an outer shell formed by polymerization of a mixture of monomers consisting essentially of about 30 to about 98 mole percent methyl methacrylate, 0 to about 68 mole percent of unsaturated monomers selected from monofunctional monoacrylates, diacrylates, monovinyl hydrocarbons, and divinyl hydrocarbons, and about 2 to about 35 mole percent of a monomer having an olefinic group reactable with said methyl methacrylate and an epoxy-functional group which
      (a) remains unreacted in said polymerization and
      (b) provides said shell with surface functionality that is reactive with said polymer, of polymerized unsaturated compounds and
B. said polymer of polymerized unsaturated compounds has functionality selected from carboxy functionality, epoxy functionality and hydroxy functionality and being present in a crosslinking amount.

12. A molded, thermoset, polymeric material in accordance with Claim 11 wherein said core is formed from about 80 to about 98 mole percent of an ester of acrylic acid and a $C_2$–$C_8$ monohydric alcohol and about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ trihydric alcohol.

13. A molded, thermoset, polymeric material in accordance with Claim 11 wherein said functionality of said polymer of polymerized unsaturated compounds is carboxy functionality.

14. A molded, thermoset, polymeric material in accordance with Claim 11 wherein said functionality of said polymer of polymerized unsaturated compounds is epoxy functionality.

15. A molded, thermoset, polymeric material in accordance with Claim 11 wherein said functionality of said polymer of polymerized unsaturated compounds is hydroxy functionality.

16. In a molded, thermoset, polymeric material wherein a polymer of polymerized unsaturated compounds having functionality selected from carboxy functionality, epoxy functionality and hydroxy functionality and a polyepoxide having at least two epoxy groups per molecule reacted therewith in crosslinking amounts, the improvement which comprises the dispersion throughout said thermoset polymeric material of graded-rubber particles which are reacted with said polymer, said or both said polymer and said polyepoxide, said graded-rubber particles consisting essentially of:
   (1) about 10 to about 90 weight percent a core of crosslinked acrylic polymer consisting essentially of
      (a) a major amount of a monofunctional monoacrylate constituting at a minimum 80 mole percent, and
      (b) a minor and crosslinking amount of a di- or tri- functional monomer containing two or more non-conjugated terminal ethylenic groups not exceeding about 20 mole percent of the core reactants, and
   (2) about 90 to about 10 weight percent an outer shell formed by polymerization of a mixture of monomers consisting essentially of about 30 to about 98 mole percent methyl methacrylate, 0 to about 68 mole percent of unsaturated monomers selected from monofunctional monoacrylates, diacrylates, monovinyl hydrocarbons, and divinyl hydrocarbons, and about 2 to about 35 mole percent of a monomer having an olefinic group reactable with said methyl methacrylate and an epoxy-functional group which
      (a) remains unreacted in said polymerization and
      (b) provides said shell with surface functionality that is reactive with said polymer, of polymerized unsaturated compounds.

17. A molded, thermoset, polymeric material in accordance with Claim 16 wherein said core is formed from about 80 to about 98 mole percent of an ester of acrylic acid and a $C_2$–$C_8$ monohydric alcohol and about 2 to about 20 mole percent of divinyl benzene, a diester of acrylic or methacrylic acid and a $C_2$–$C_8$ dihydric alcohol or a triester of acrylic or methacrylic acid and a $C_2$–$C_8$ trihydric alcohol.

18. A molded, thermoset, polymeric material in accordance with Claim 16 wherein said functionality of said polymer of polymerized unsaturated compounds is carboxy functionality.

19. A molded, thermoset, polymeric material in accordance with Claim 16 wherein said functionality of said polymer of polymerized unsaturated compounds is epoxy functionality.

20. A molded, thermoset, polymeric material in accordance with Claim 16 wherein said functionality of said polymer of polymerized unsaturated compounds is hydroxy functionality.

References Cited

UNITED STATES PATENTS

| | | | |
|---|---|---|---|
| 3,502,745 | 3/1970 | Minton | 260—881 |
| 3,423,481 | 1/1969 | Mizutani | 260—836 |
| 3,437,514 | 4/1969 | Burlant | 117—93.31 |
| 3,450,796 | 6/1969 | Griffin | 260—885 |
| 3,528,844 | 9/1970 | Burlant | 260—885 |

PAUL LIEBERMAN, Primary Examiner

U.S. Cl. X.R.

260—831, 834, 835, 861, 876 R, 881, 885